United States Patent
Kobayashi et al.

(10) Patent No.: US 9,489,587 B2
(45) Date of Patent: Nov. 8, 2016

(54) CHARACTER READER AND CONTAINER INSPECTION SYSTEM USING CHARACTER READER

(71) Applicant: NIHON YAMAMURA GLASS CO., LTD., Amagasaki-shi, Hyogo (JP)

(72) Inventors: Daisuke Kobayashi, Amagasaki (JP); Naohiro Tanaka, Amagasaki (JP)

(73) Assignee: NIHON YAMAMURA GLASS CO., LTD., Amagasaki-Shi, Hyogo (JP)

( * ) Notice: Subject to any disclaimer, the term of this patent is extended or adjusted under 35 U.S.C. 154(b) by 4 days.

(21) Appl. No.: 14/432,194

(22) PCT Filed: Sep. 18, 2013

(86) PCT No.: PCT/JP2013/075083
§ 371 (c)(1),
(2) Date: Mar. 27, 2015

(87) PCT Pub. No.: WO2014/050641
PCT Pub. Date: Apr. 3, 2014

(65) Prior Publication Data
US 2015/0227804 A1    Aug. 13, 2015

(30) Foreign Application Priority Data

Sep. 28, 2012   (JP) ................... 2012-217307

(51) Int. Cl.
*G06K 9/60*     (2006.01)
*G06K 9/62*     (2006.01)
(Continued)

(52) U.S. Cl.
CPC ............ *G06K 9/2054* (2013.01); *G06K 9/209* (2013.01); *G06K 9/325* (2013.01); *G06K 9/6255* (2013.01); *G06K 9/64* (2013.01); *G06K 2209/01* (2013.01)

(58) Field of Classification Search
CPC ......... G01N 21/90–21/909; G01N 2033/0081
See application file for complete search history.

(56) References Cited

U.S. PATENT DOCUMENTS 5,204,911 A * 4/1993 Schwartz ............ G06K 9/6202
                                                              348/92
5,405,015 A    4/1995 Bhatia et al.
(Continued)

FOREIGN PATENT DOCUMENTS

EP          256804 A2      2/1988
JP    H07-218446 A         8/1995
(Continued)

OTHER PUBLICATIONS

"Neural Networks, Tricks of the Trade, 2nd ed.", pp. 237 and 266, Jan. 1, 2012.
(Continued)

*Primary Examiner* — Brian P Werner
(74) *Attorney, Agent, or Firm* — Rabin & Berdo, P.C.

(57) ABSTRACT

A character reader 200 for reading and recognizing a character displayed at a predetermined height position on the outer peripheral surface of a plurality of cylindrical containers (for example, bottles BT), the character reader includes: a rotary drive mechanism 203 to 207 for supporting the cylindrical container to rotate the cylindrical container around the central axis thereof; a camera 201 positioned to face the cylindrical container so that a character displayed on the outer peripheral surface of the cylindrical container is captured within the visual field; and an image processing device for acquiring an image at the height position where the character is displayed over an angular range more than one rotation of the cylindrical container by controlling the imaging operation of the camera 201, thereby executing recognition processing. The image processing device includes: a search means for searching an image portion including all characters from the acquired image; a character recognition means for recognizing a character to be recognized by collating the image of a character to be recognized included in the image portion searched by the search means with the model images of a plurality of types of characters; and an output means for outputting a recognition result recognized by the character recognition means for each cylindrical container.

4 Claims, 6 Drawing Sheets

(51) Int. Cl.
*G06K 9/20* (2006.01)
*G06K 9/32* (2006.01)
*G06K 9/64* (2006.01)

(56) References Cited

U.S. PATENT DOCUMENTS

| | | | | |
|---|---|---|---|---|
| 5,499,718 A | * | 3/1996 | Bhatia | B07C 5/3408 209/524 |
| 5,926,556 A | * | 7/1999 | Douglas | G06K 7/10722 250/223 B |
| 2011/0150346 A1 | | 6/2011 | Panetta | |

FOREIGN PATENT DOCUMENTS

| | | |
|---|---|---|
| JP | 2000-292370 A | 10/2000 |
| JP | 2000-348167 A | 12/2000 |
| JP | 2003-168119 A | 6/2003 |
| JP | 2003-187187 A | 7/2003 |
| JP | 2006-075897 A | 3/2006 |
| JP | 4444273 B2 | 3/2010 |
| JP | 2012-150072 A | 8/2012 |

OTHER PUBLICATIONS

Extended European Search Report dated Jun. 27, 2016.

* cited by examiner

| DEFECT \ MOLD NUMBER | 1 | 2 | 3 | 4 | ... | 19 | 20 |
|---|---|---|---|---|---|---|---|
| DEFECT 1 | 0 | 0 | 1 | 0 | ... | 0 | 0 |
| DEFECT 2 | 0 | 0 | 0 | 0 | ... | 4 | 0 |
| DEFECT 3 | 8 | 14 | 0 | 1 | ... | 0 | 0 |
| ⋮ | ⋮ | ⋮ | ⋮ | ⋮ | ... | ⋮ | ⋮ |
| DEFECT N | 0 | 0 | 0 | 2 | ... | 0 | 0 |

(1) MODEL IMAGE (2) DEFORMATION MODEL IMAGE

CHARACTER READER AND CONTAINER INSPECTION SYSTEM USING CHARACTER READER

FIELD OF THE INVENTION

The present invention relates to a character reader for reading a character such as a mold number displayed on the outer peripheral surface of cylindrical containers, for example, glass bottles and plastic bottles manufactured with a plurality of molds, and a container inspection system incorporating the character reader.

BACKGROUND OF THE INVENTION

Bottle making machines are divided into a plurality of sections respectively including a rough mold and a finishing mold, and are installed at a manufacturing site for glass bottles. Bottles of the same type are manufactured all together at each section of the bottle making machines, and thereafter, each manufactured bottle is subjected to a plurality of types of inspections. Each bottle bears a code mark representing a mold number specific to a mold belonging to respective bottle manufacturers in order to control quality and improve productivity, and an inspection system including a reader for reading a code from the code mark and various types of inspection machines is installed at the manufacturing site for glass bottles.

The inspection system prepares inspection result information wherein a mold number read from each bottle is mapped to each type of inspection results for each bottle, and totalize the number of defects detected by each inspection machine using the inspection result information for each type of defects and for each model number. A site worker can check the totalized result using a terminal device in the system, and thus can easily identify molds that generate many defects and take rapid countermeasures including the inspection and repair of a mold.

Conventionally, a code mark representing a mold is usually displayed on the bottom of bottles as an arrangement of projections representing a binary code. However, the projections of the code mark projected from the bottom of bottles may have a negative impact on the inspection of the content therein by a customer after the bottles were filled with the content. Further, a bottle having a significantly elevated bottom may cause the problem that the projections of the code mark cannot be exactly imaged. As such, code marks are often displayed on the outer peripheral surface of a bottle, specifically on the outer peripheral surface of the heel portion of a bottle.

For example, a patent document 1 describes a device capable of reading a code mark represented by the arrangement of projections formed on the outer peripheral surface of a heel portion. The device recognizes code information the code mark shows by generating a signal representing an uneven state in a circumferential direction of the heel portion using an optical sensor and analyzing the signal, while rotating a bottle using a frictional force generated by a frictional roller that is brought into contact with the bottle supported on a table.

A bottle, which bears a code mark using projections on the outer peripheral surface, displays a character string code including digits that coincide with the code mark to allow a person to recognize the code mark. The character string code may include alphabetical letters and so forth representing the manufacturing site in addition to digits representing a mold. The code mark using projections has some standards, and thus a reading program needs to be changed depending on the standard applied to a bottle to be read. It is intended to develop a device capable of reading a mold number from an image acquired by imaging the character string code with a camera in order to avoid such a cumbersome process.

For example, a device disclosed in a patent document 2 is configured such that a bottle displaying embossed characters on the outer peripheral surface of the heel portion is placed on a turn table; a translucent screen is arranged to face the heel portion of the bottle on the turn table; and an illumination device is disposed at a position to face the screen across the bottle. The light emitted from the illumination device passes through the bottle so that an image is projected on the screen. The image is captured with a camera and characters representing a mold number can be recognized on an image generated.

RELATED ART

Patent Document

[Patent Document 1]
European Patent Application Publication No. 0256804
[Patent Document 2]
Publication of Japanese patent No. 4444273

SUMMARY OF THE INVENTION

Problem to be Solved by the Invention

The device disclosed in the patent document 2 is configured to acquire an image of characters with sharp and clear contour by illuminating the character portions from behind because the characters projecting from the outer peripheral surface are the objects to be read. However, the characters to be recognized are not limited to these projecting characters, but may include characters recessed from the outer peripheral surface, or for example, may be represented as printed characters, as in a PET bottle.

Further, a container itself is not limited to those that are transparent and translucent, but an almost light-impermeable container may be an object to be read. An illumination condition varies with the type of characters on a container and the transmissivity of the container, and thus if the illumination condition is fixed like a device shown in the patent document 2, it becomes impossible to deal with various situations.

Further, when a camera and an illumination device are arranged opposite each other with a container to be read placed therebetween, a space for installing an illumination device needs to be provided behind the container. However, it is structurally difficult to secure such an installation space, for example, in an inspection device incorporating a star wheel therein, and thus this type of reader, when used, involves many restrictions.

The present invention has been made in view of the above-mentioned problem, and the object is to provide a character reader capable of simply and accurately recognizing a character displayed on the outer peripheral surface of a cylindrical container without being subject to many types of restrictions relating to illumination.

Means for Solving the Problem

A character reader according to the present invention is a device for reading and recognizing a character displayed at a predetermined height position on the outer peripheral surface of a plurality of cylindrical containers, the character reader including: a rotary drive mechanism for supporting the cylindrical container to rotate the cylindrical container around the central axis thereof; a camera positioned to face the cylindrical container so that a character displayed on the outer peripheral surface of the cylindrical container is captured within the visual field; and an image processing device for acquiring an image at the height position where the character is displayed over an angular range more than one rotation of the cylindrical container by controlling the imaging operation of the camera, thereby executing recognition processing.

The image processing device comprises: a search means for searching an image portion including all characters from the acquired image; a character recognition means for recognizing a character to be recognized by collating an image of the character to be recognized included in the image portion searched by the search means with the model images of a plurality of types of characters; and an output means for outputting a recognition result recognized by the character recognition means for each cylindrical container.

The character to be recognized may consist of a single character, but each character in a character string including a series of multiple characters may be recognized. Alternatively, a single or multiple characters included in a part of a character string may be the object to be recognized. Further, the character to be recognized may be either a type of character projecting from the outer peripheral surface of a container or the other type of character that is recessed from the outer peripheral surface of a container. Further, for a container that is made of a synthetic resin such as a PET bottle, a character printed on the outer peripheral surface thereof may be the object to be recognized.

According to the character reader having the above-mentioned structure, the imaging using a camera is carried out while the cylindrical container to be read is rotated by a rotary drive mechanism, thereby generating an image having an angular range more than one rotation of the cylindrical container. In this way, no matter how far the character at the predetermined height position on the outer peripheral surface of the container is located away from the visual field of a camera prior to the rotation of the container, it is possible to generate an image wherein all of the characters appear without being divided. Accordingly, the character to be recognized can be correctly recognized by searching an image portion including all characters from the above-mentioned image and collating the image portion with the model images of a plurality of types of characters.

In a character reader according to an embodiment described above, a line scan camera may be used as a camera. The camera is positioned such that the alignment direction of pixels is along the height direction of a cylindrical container.

According to the embodiment described above, by repeating imaging with the line scan camera in accordance with the rotation of the container, the height position where characters on the outer peripheral surface of the container are displayed can be imaged over an angular range more than one rotation.

When using a line scan camera, it is desirable to carry out imaging with illumination (reflected illumination) that allows the surface of a container to be irradiated with light emitted from the front side of the visual field of a camera so that the light reflected on the surface of the container is incident onto the camera, or to carry out imaging with illumination (transmissive illumination) to allow the light passing through the container to be incident onto the camera with a light source disposed opposite the camera across the container. Whereas, when using an area camera, the visual field of the camera is not necessarily illuminated.

In a character reader according to another embodiment, in order to recognize characters, a character recognition means is used to execute any one of a first collation method whereby the image of a character to be recognized is collated with a standard model image for each of a plurality of types of characters and a plurality of model images created by increasing or decreasing the character-width of each standard model image; a second collation method whereby a plurality of images created by increasing or decreasing the character-width of the image of the character to be recognized is collated with the standard model image for each of the plurality of types of characters; and a third collation method whereby the plurality of images created by increasing or decreasing the character-width of the image of the character to be recognized is collated with the standard model image for each of the plurality of types of characters and the plurality of model images created by increasing or decreasing the character-width of each standard model image.

In a case where a container to be read is imaged while the container is rotating, a recognition error might be caused by the deformation of a character in an image in the width direction, when the container rotates idly to duplicately image the same portion of the character or when the rotational speed of the container increases so that a part of the image is lost.

However, according to the above-mentioned embodiment, a collation is carried out by increasing or decreasing the character-width of a standard model image for each character, the image of a character to be recognized, or both the standard model image and the image of a character to be recognized, and thus by elongating and contracting the width of the model image or the image of a character to be recognized in various ways. Therefore, the accuracy of recognition can be ensured even when a character is deformed due to idle rotation or variations in rotational speed.

In a character reader according to another embodiment, the rotary drive mechanism includes: a table for rotatably supporting a cylindrical container; a frictional roller brought into contact with the outer peripheral surface of the cylindrical container to rotate the cylindrical container around central axis thereof with a frictional force; and a motor for driving the frictional roller. According to the embodiment, a cylindrical container to be read is placed on the table in contact with the frictional roller, and the cylindrical container can be rotated by driving the frictional roller with the motor.

An inspection system according to the present invention includes: an inspection device for inspecting cylindrical containers formed by a plurality of molds with characters identifying each mold displayed at a predetermined height position on the outer peripheral surface to determine the quality of the cylindrical containers for a plurality of inspection items; a character reader for reading and recognizing the characters on a plurality of cylindrical containers to be inspected by the inspection device; and an information processing device for executing a process of totalizing inspection results by the inspection device for each inspection item of each container for each mold corresponding to characters read by the character reader. The character reader includes the above-mentioned rotary drive mechanism, a camera, and an image processing device, and the image processing device includes the above-mentioned search means, character recognition means and the output means.

Effect of the Invention

According to the present invention, when reading and recognizing characters displayed on the outer peripheral surface of a container, no matter where the characters are located, it is possible to generate an image wherein all of the characters appear without being divided, to accurately search the characters to be recognized, and to thereby recognize the characters. Further, it is possible to freely select an appropriate illumination condition suitable for the acquisition of the image that helps recognize the characters in accordance with the type of characters displayed on the container and the transmissivity of the container and so forth, and to easily secure a space for installing the illumination device even with an inspection device having a star wheel incorporated therein.

MODE FOR CARRYING OUT THE INVENTION

Figure 1:
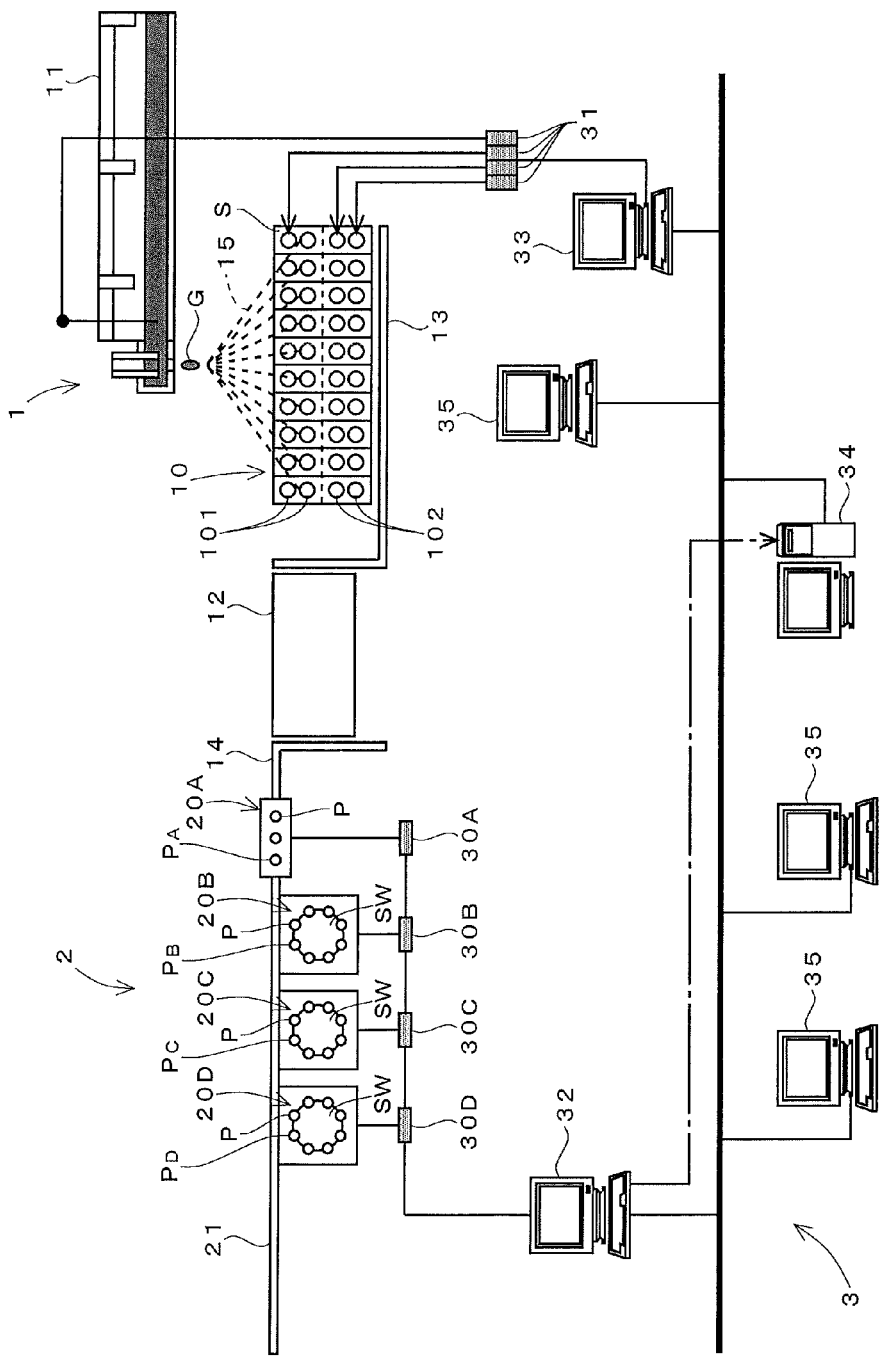
FIG. 1 is a schematic structural view illustrating a manufacturing plant for glass bottles.

FIG. 1 is a schematic view illustrating a manufacturing plant for glass bottles according to the present invention.

The plant according to this embodiment includes production process 1 for manufacturing bottles, inspection process 2 involving a plurality of inspection units, and a quality control system 3 constituted by a computer network.

The production process 1 includes: a bottle making machine 10 divided into a plurality of sections S; a gob production device 11 for producing gob G (lump of molten glass) supplied to each section S of the bottle making machine 10; a lehr 12 for cooling a bottle manufactured by the bottle making machine 10, a first conveyance path 13 for conveying the bottle carried out from the bottle making machine 10 to the lehr 12; a second conveyance path 14 for conveying the cooled bottle to an inspection process 2, and so forth.

The bottle making machine 10 shown in the drawing has 10 sections S aligned side by side. Each section S is provided with two rough molds 101 and two finishing molds 102. Each rough mold (101, 101) and each finishing mold (102, 102) in a section S are coupled to one another with one-to-one relationship.

The gob G produced by the cob production device 11 is sequentially distributed to the rough molds 101 by a distribution mechanism 15, and is molded into a parison by the rough molds 101. Thereafter the parison is supplied to corresponding finishing mold 102 so that a bottle in its final form is molded. A character string code including digits indicative of a mold number specific to the mold is engraved by the finishing mold 102 at the heel portion of the bottle in its final form.

The inspection process 2 is provided with a third conveyance path 21 connected to the second conveyance path 14. A plurality of inspection units (four inspection units 20A, 20B, 20C, 20D in this embodiment) is disposed along the third conveyance path 21. Bottles carried out from the lehr 12 are aligned along the conveyance direction while they are passing through the second conveyance path 14, and are sequentially transferred into each inspection unit 20A through 20D.

A leading inspection unit 20A among the four inspection units 20A to 20D is provided with a plurality of inspection stations P along the conveyance direction of bottles. Other inspection units 20B, 20C, 20D are provided with a plurality of inspection stations P in a circular pattern, and star wheels SW are provided to have the same number of recesses as the number of the inspection stations P. A sequential feeding mechanism 22 (shown in FIG. 5) intermittently rotates each star wheel SW so that bottles are captured one by one and fed into each inspection station P in sequence.

Each inspection station P excluding the last inspection stations (shown as $P_A$, $P_B$, $P_C$, $P_D$ in the drawing) in each inspection unit 20A to 20D is provided with an inspection machine (not shown) that carries out inspection for a prescribed item respectively. The last inspection stations $P_A$, $P_B$, $P_C$, $P_D$ are provided with a character reader 200 (shown in FIGS. 4, 5) for reading a mold number from the heel portion of a bottle.

The above-mentioned inspection units 20A to 20D are further provided with a programmable logic controller 250 (shown in FIG. 5 and hereinafter simply referred to as "controller 250") for controlling the operations of the sequential feeding mechanism 22 for bottles and the inspection machine of each inspection station P. The controller 250 has a storage unit corresponding to each inspection station P, and accepts information showing an inspection result for a prescribed item or information showing a read mold number respectively from an inspection machine of each inspection station P and the character reader 200 each time bottles are fed sequentially, and thus rewrites the information in each storage unit. Further, information previously stored in the storage unit of the last inspection station P is transferred to the storage units of a second and following inspection stations P, and then new information from the corresponding inspection station P is added to the transferred information. As a result, each time bottles are fed sequentially, the storage units of the last inspection stations $P_A$, $P_B$, $P_C$, $P_D$ store information (hereinafter, referred to as "inspection result information"), which is generated by combining inspection results of all inspection items (indicative of presence and absence of defect for each type of defect) for inspection-completed bottles at the corresponding inspection units 20A, 20B, 20C, 20D with the mold number read from the bottle by the character reader 200.

Although, not shown in FIG. 1, a reject table is provided on the downstream side of each inspection unit 20A, 20B, 20C, 20D. Bottles from which inspection result information including information indicative of defect is derived are not returned to the conveyance path 21, but carried out to the reject table.

The quality control system 3 includes: an information collection device 30A, 30B, 30C, 30D provided on each inspection unit 20A to 20D for collecting the above-mentioned inspection result information; a plurality of information collection devices 31 provided for collecting the operation information for each type of device in the production process 1; an analysis terminal device 32 for compiling and analyzing the information collected by the information collection devices 30A, 30B, 30C, 30D near the inspection process 2; an information collection terminal device 33 for compiling and analyzing the information collected by the information collection devices 31 near the production process 1; a management server 34; and a plurality of client terminal devices 35.

The information collection devices 30A to 30D, 31 are constituted by box-like housings which store a control substrate including a microcomputer (referred to as a logger box). The analysis terminal devices 32, 33 and the client terminal devices 35 are personal computers, and the management server 34 is a dedicated server. These devices 30A to 30D, 31, 32, 33, 34, 35 are connected via a LAN.

The controller 250 for each inspection unit 20A to 20D transmits the inspection result information stored in storage units for the last inspection stations $P_A$, $P_B$, $P_C$, $P_D$ to the corresponding information collection devices 30A to 30D each time the rewriting process for each storage unit completes associated with sequential feeding of bottles. The information collection devices 30A to 30D put together the inspection result information and send it to the analysis terminal device 32 at regular time intervals.

Figures 2, 3:
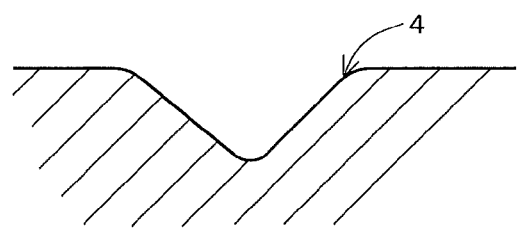
FIG. 2 is a view illustrating an example of a totalization table generated by inspection result information.
FIG. 3 is a cross-sectional view illustrating an example of V-shape groove forming a line of an engraved character.

The analysis terminal device 32 totalizes the number of defects for each type of defect and for each mold number using the inspection result information sent from each information collection device 30A to 30D, and edits the totalization results into a totalization table as shown in FIG. 2. The totalization table is updated at an every prescribed time interval and transferred to the management server 34 to be saved therein. The totalization table saved in the management server 34 is rendered readable using each client terminal device 35.

The bottle making machine 10 according to this embodiment includes 10 sections S. Each section S has two rough molds 101 and two finishing molds 102 respectively. Different digits from 1 to 20 are respectively assigned to twenty rough molds 101 and twenty finishing molds 102 as mold numbers. FIG. 2 shows the totalization table wherein the cumulative total value of defects in every combination of each mold number 1 to 20 and N items representing types of defect (each item is represented as defect 1, defect 2 . . . defect N in the illustrated example) is saved.

The information collected by the information collection device 31 near the production process 1 is also sent to the analysis terminal device 33 for the production process 1 and analyzed in the same manner. The analysis results are saved in the management server 34. Managers and operators in a plant may access the management server 34 using the client terminal device 35 and call the totalization table shown in FIG. 2 as necessary to check the occurrence of defects for each mold. In this way, they can swiftly identify molds where defects are increasing and molds where the same defects are successively occurring. Further, it is also possible to estimate the causes of defect occurrence for the identified molds by reviewing the analysis result information generated by the analysis terminal device 33, and by reviewing the actual operation state.

Further, in the embodiment shown in FIG. 1, the character readers 200 are disposed in each last inspection station $P_A$, $P_B$, $P_C$, $P_D$ in the plurality of inspection units 20A to 20D, but not limited to this, the character readers 200 may be disposed in the leading stations among the plurality of inspection stations. Additionally, in a case where defect bottles are not removed in the middle of inspection, and all of the bottles introduced into the inspection process pass through the inspection units 20A to 20D in constant sequence, the character reader 200 may be disposed only in the leading inspection unit 20A or in the last inspection unit 20D.

As describe above, each finishing mold 102 of the bottle making machine 10 according to this embodiment, molds a bottle bearing a character string code engraved at the heel portion thereof, the character string code including a mold number specific to the mold.

As shown in FIG. 3, each character constituting a character string code is represented by a V-shape groove 4 with the central portion of the character width as the groove bottom. However, the position of the groove bottom and the depth of the groove may be changed as necessary. Further, the shape of the groove is not limited to a V-shape; the groove may be changed to have a bottom formed into a nearly flat shape.

The above-mentioned character reader 200 has a function of reading and recognizing a mold number from a character string code engraved at the heel portion of a bottle.

Figure 4:
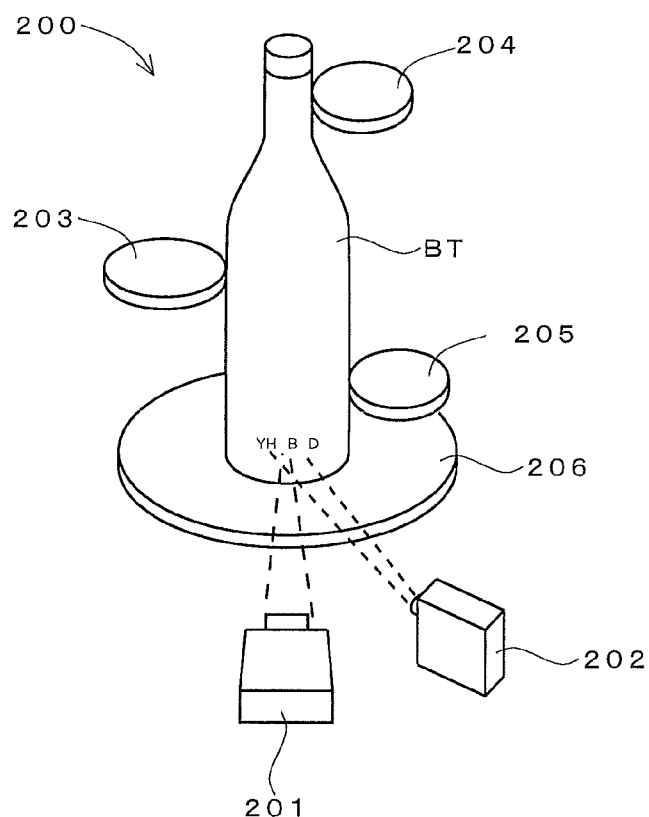
FIG. 4 is a view illustrating schematic configuration of the appearance of a character reader together with a reading method.
Figure 5:
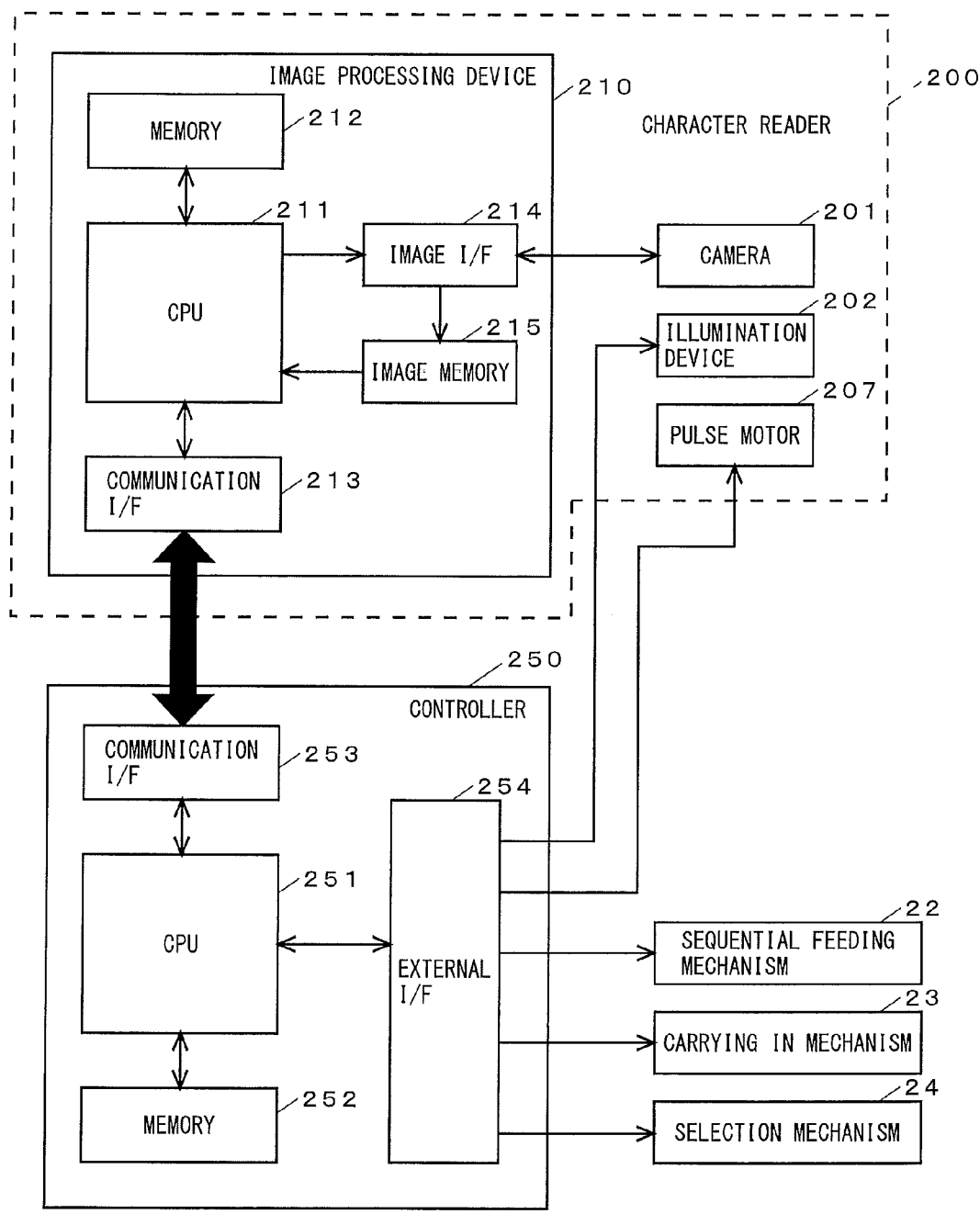
FIG. 5 is a block diagram illustrating the electrical configuration of the character reader and a controller.

FIG. 4 shows the schematic configuration of the character reader 200, and FIG. 5 shows the electrical configuration of the character reader 200 and the above-mentioned controller 250 respectively.

The character reader 200 according to this embodiment includes a rotatable table 206 on which a bottle BT to be read is placed, a camera 201, an illumination device 202, a frictional roller 203, a pulse motor 207 for driving the frictional roller 203, a pair of rotatable support rollers 204, 205, an image processing device 210 for processing images captured by the camera 201 and so forth. The above-mentioned table 206, the frictional roller 203, the pulse motor 207, and the support rollers 204, 205 constitute a rotary drive mechanism which supports the bottle BT and rotates the bottle BT around the central axis thereof. Further, in this embodiment, a part of the control function of the character reader 200 is assigned to the controller 250 in the same inspection unit. When this character reader 200 is disposed in the inspection units 30B, 30C, 30D shown in FIG. 1, the camera 201 and the illumination device 202 are disposed at the outside of the rotation range of the star wheel SW.

In the embodiment shown in FIG. 4, the frictional roller 203 is disposed to be brought into contact with the middle height portion of the body of the bottle BT placed at the rotational center of the table 206. The support rollers 204, 205 are disposed opposite the frictional roller 203 to support the neck and body portions of the bottle BT respectively. The positions of these rollers 203, 204, 205 can be changed as necessary in accordance with the height and the diameter of the bottle BT to be read.

The frictional roller 203 is rotated by a rotational force of the pulse motor 207, and a frictional force generated between the frictional roller and the bottle BT causes the bottle BT to rotate around the central axis thereof.

The camera 201 according to this embodiment is a line scan camera, which is positioned to face the bottle BT so that the character string code displayed at the heel portion of the bottle BT is captured within the visual field. The pixels of the camera 201 are aligned along the height direction of the heel portion of the bottle BT.

The illumination device 202 emits diffusion light and is disposed to illuminate the visual field of the camera 201 from the diagonal front. The light emitted from the illumination device 202 and reflected on the outer peripheral surface of the bottle BT is diffused, but the light incident on the V-shape groove 4, which forms an engraved character, is reflected on the tilted surface in the groove 4 and travels in a direction different from the direction toward the camera 201. As a result, the camera generates an image wherein the character portion corresponding to the V-shape groove 4 looks dark while the background looks bright.

The position of the illumination device 202 and the direction of the optical axis thereof can be changed as necessary in accordance with the shape or the like of the groove 4 which forms a character to be recognized. Further, when recognizing a type of character projecting from the surface of the bottle BT, a transmissive illumination system may be selected instead of a reflected illumination system.

The image processing device 210 shown in FIG. 5 is provided with a CPU 211, a memory 212 (including ROM, RAM, and a mass memory such as a hard disc), a communication interface 213, an image interface 214, an image memory 215 and so forth.

The image interface 214 operates the camera 210 to perform imaging in response to a command from the CPU 211, while taking in line images outputted from the camera 201 and outputting the line images into the image memory 215. The image memory 215 accumulates the line images supplied from the camera 201 to be arranged in the direction orthogonal to the alignment of the pixels.

The controller 250 is provided with a CPU 251, a memory 252, a communication interface 253, an external interface 254 and so forth. The memory 252 includes a ROM, RAM, and a mass memory such as a hard disc, and the above-mentioned storage units for each inspection station P and a storage area for registering a model image and so forth are provided therein.

The external interface 254 is connected to the sequential feeding mechanism 22 for the star wheel SW, a carrying in mechanism 23 for taking in the bottle BT from the third conveyance path 21, a selection mechanism 24 for feeding the bottles BT for which inspection has been finished either to third conveyance path 21 or to a reject table, and so forth. Further, the illumination device 202 of the character reader 200 and the pulse motor 207 are also connected to the external interface 254 of the controller 250, and thus controlled by the controller 250.

The CPU 251 of the controller 250 and the CPU 211 of the image processing device 210 communicate with each other via each of the communication interfaces 253, 213, and thus perform respective processing in synchronization with each other. Specifically, while the CPU 251 of the controller 250 rotates the pulse motor 207, the CPU 211 of the image processing device 210 operates the camera 201 to repeat imaging (including exposure and scanning process of an image signal for each pixel), and acquires a line image over a prescribed angular range more than one rotation of the bottle BT (for example, 540 degrees). The line image generated by each time imaging is accumulated in the image memory 215, and thus a two-dimensional image is generated.

The rotational speed of the pulse motor 207 is adjusted to a speed which enables continuous imaging over the entire circumference of the heel portion of the rotating bottle BT on the basis of the imaging cycle of the camera 201 and so forth. Thereby, the process of imaging an area within a prescribed height range corresponding to the heel portion of the bottle BT is repeatedly performed over a prescribed angular range more than one rotation of the bottle BT, and thus a two-dimensional image is generated as if the outer peripheral surface of the heel portion is spread out (shown in FIG. 6).

Although not shown in FIG. 5, the CPU 251 of the controller 250 controls each operation of the inspection machines for other inspection stations P (not shown) while communicating with the inspection machines in addition to the image processing device 210. Further, the CPU 251 updates the information in aforementioned each storage unit in synchronization with the operation of each mechanism 22, 23, 24, while sending inspection result information to the information collection device 30 (any of 30A to 30D).

Figure 6:
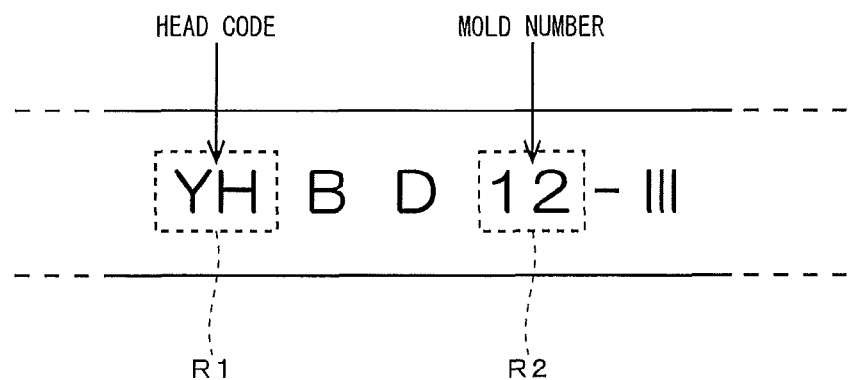
FIG. 6 is a view illustrating an example of an image generated.

FIG. 6 schematically shows a range including a portion where a character string code appears in the above-described two-dimensional image.

In the character string code according to this embodiment, a code shared by all of the molds for the bottle making machine 10 (alphabetical character string "YH" in the illustrated example) is arranged at the head of the character string code, and digits Representing a mold number ("12" in the illustrated example) are subsequently arranged with a code having two alphabetical characters interposed therebetween.

The image processing device 210 of the character reader 200 searches the code "YH" at the head of the above-described character string code (hereinafter, referred to as "head code"), thereafter detects and recognizes the digits representing a mold number with reference to the head code. For this purpose, in this embodiment, a sample image is acquired by imaging a sample of a bottle BT having a good quality which was preliminarily manufactured by each finishing mold 102 of the bottle making machine 10; a model image having the head code "YH" and a model image having each digit of "0" to "9" used in a mold number are generated using the sample image; and these model images are registered in the memory 212 of the image processing device 210.

Further, the distance from the head code to the mold number and the size of the area including the mold number in the image are identified from the sample image, and registered in the memory 212 in the same manner. The size of the area including the mold number is used as the data for setting the area to be read, and the distance from the head code to the mold number is used as a reference distance for setting the area to be read on the basis of the head code in the image.

In FIG. 6, R1 represents an area detected by a model image for the head code. R2 represents an area to be read, which is set on the basis of the above-mentioned set data and the reference distance.

Meanwhile, when the frictional roller 203 rotates a bottle BT as shown in this embodiment, if idle rotation of the bottle BT occurs due to the slip of the frictional roller 203, the same portion of the outer peripheral surface of the bottle BT may be duplicately imaged. This duplicate imaging causes the width of the corresponding portion in the image to be enlarged, and therefore, in this embodiment, a plurality of deformation model images deformed in the width direction is prepared for each model image so that these deformation model images are used together with the model image for the character recognition processing.

Figure 7:
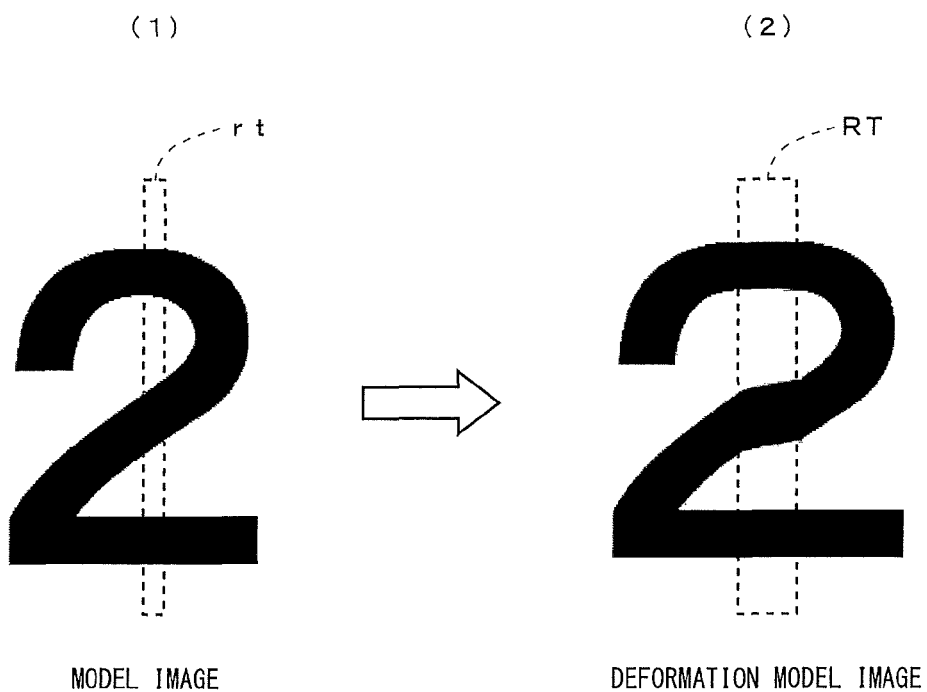
FIG. 7 is a view illustrating a deformation example of a model image.

FIG. 7 shows an example of methods for preparing a deformation model image from a model image for the digit "2". In this embodiment, the image corresponding to a portion of character width in a model image (an image contained in a rectangular area rt in FIG. 7(1)) is enlarged in the width direction with a prescribed magnification q, and the corresponding portion of the original model image is replaced by the enlarged portion, and thus a deformation model image is prepared as shown in FIG. 7(2). In this deformation model image, the image within a rectangular area RT corresponding to the rectangular area rt is q times enlarged in the width direction, but other portions are the same as those in the original model image.

In this embodiment, a plurality of types of deformation model images is prepared from one model image by changing the position of a portion to be enlarged and the width thereof in multiple ways for each model image.

Figure 8:
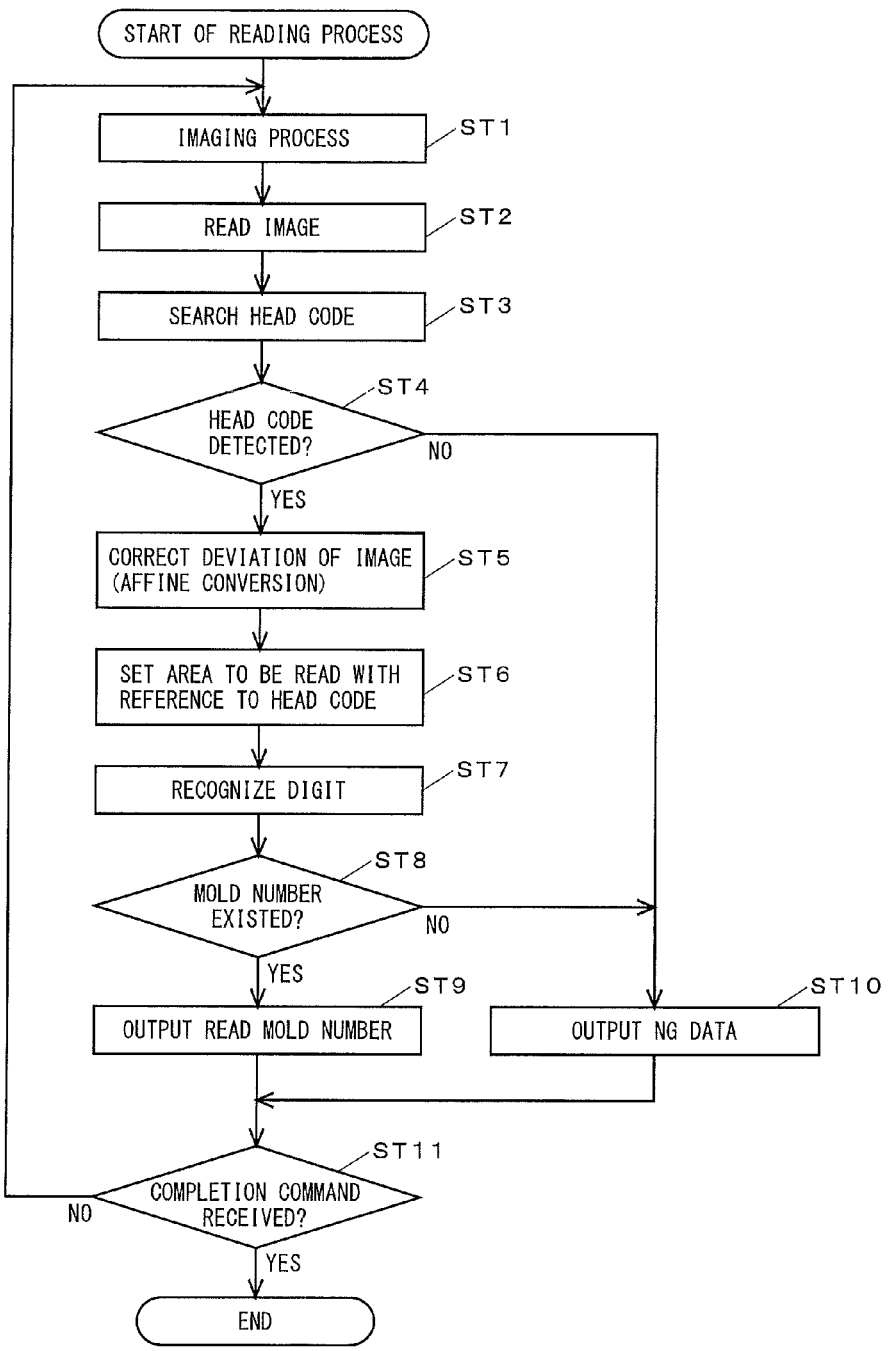
FIG. 8 is a flowchart illustrating steps of reading process.

The above-mentioned each deformation model may be stored also in the memory 212 together with the model image, or may be prepared prior to a reading process shown in FIG. 8 or in a first character recognition process (ST7) during the reading process, and then temporarily stored in a work area of the memory 212.

FIG. 8 shows procedures carried out by the character reader 200 after the above-mentioned registration is completed. The procedures are started in response to a command from the controller 250, and a loop of ST1 to ST11 is repeated in synchronization with the sequential feeding of bottles BT.

In a first step ST1, the controller 250 controls the camera 201 so that imaging is repeatedly performed in accordance with a period while the pulse motor 207 rotates. The repetition of imaging allows the image memory 215 to store a two-dimensional image over a prescribed angular range more than one rotation of the bottle.

The CPU 211 of the image processing device 210 reads the two-dimensional image from the image memory 215 in a step ST2 and stores it in the work area of the memory 212 as an image to be processed. Then, in the following step ST3, the CPU 211 searches the head code in the image to be processed using the model image for the head code.

Specifically, in step ST3, a process of determining a degree of similarity between the image to be processed and the model image (pattern matching) is carried out at each scanning position while scanning the model image for the head code on the image to be processed, so that the CPU identifies the area where the degree of similarity becomes highest (the area R1 shown in FIG. 6). When the highest degree of similarity is equal to or higher than a prescribed threshold, the CPU determines that the head code is detected; a step ST4 becomes "YES"; and thus the program goes to a step ST5.

In step ST5, the rotational angle of the area R1 relative to the model image is measured, the area R1 being identified as the image corresponding to the head code on the basis of the above-mentioned search. Then, the image to be processed is corrected by an affine transformation using the measured value so that the head code is not rotationally deviated.

In step ST6, the area R2 to be read is set at a position away from the head code of the corrected image to be processed by the reference distance in the width direction of the image (alignment direction of the original line image). Additionally, the reference distance used for setting the area R2 to be read and the set data representing the size of the area R2 are preliminarily registered by using a sample image and so on as described above, however, it is desirable to register the reference distance and the set data considering an error of the duplication of imaging due to idle rotation and so forth.

In this embodiment, an image over one and half rotation of the bottle BT is acquired, and thus the head code may be detected at two locations in the image depending on the position of the character string code at the start of imaging. In that case, a head code at a position that enables setting the area R2 without being divided is selected. Also, although the head code may be separately detected on both sides of the image, the area R1 including two-digit character string "YH" representing the head code is detected in ST3, and thus the head code existing at a location excluding both ends without being divided can be detected.

In ST7, model images for each digit are sequentially applied to the image within the area R2 to be read, which is set in ST6, so that digits representing a mold number are recognized by pattern matching.

In this embodiment, digits 1 to 20 are used as a mold number. A one digit number or two digit number is identified by sequentially selecting model images and each of the deformation model images and performing pattern matching between the model images and the image within the area R2 to be read on the assumption that characters may exist at two locations within the area R2 to be read.

When the recognition processing is completed, the CPU 211 checks whether or not the read result corresponds to the mold number. If the read result shows any one of the digits 1 to 20, then the digit is recognized as the mold number. Thus, ST8 becomes "YES" and the program goes to ST9; the CPU 211 outputs the read mold number to the controller 250.

Meanwhile, if a digit cannot be detected in the area R2 to be read, or if, although a digit was found, the digit does not indicate the mold number (for example, if "23" is indicated), then ST8 becomes "NO" and the program goes to ST10; the CPU 211 outputs NG data representing an error in reading to the controller 250. Further, in the search processing for the head code in ST3, if the head code cannot be detected (ST4 becomes "NO"), the program also goes to ST10 and the CPU 211 outputs NG data.

Similarly to the above, the loop ST1 to ST11 is repeated, and upon a receipt of a completion instruction from the controller 250 (ST11 becomes "YES"), processing is completed. Additionally, the two-dimensional image saved in the image memory 215 by the image processing in ST1 is erased each time respective subsequent steps are carried out and the program returns to ST1.

In the reading processing according to the above-described embodiment, the one and half rotation image of the bottle BT is acquired by repeating imaging by the line scan camera 201 to generate a two-dimensional image that represents a state where the outer peripheral surface of the heel portion of the bottle BT is spread out, and thus, no matter how much rotated the character string code is from the visual field of the camera 201 at the start of imaging, an image including the character string code can be acquired. Further, in the pattern matching processing for reading a digit representing a mold number, collation is carried out using not only a model image with no deformation, but also model images deformed by extending the character width of the model image (deformation model images) in a state where a portion of the character width is deformed by the duplication of imaging due to idle rotation and so forth, and thus the accuracy of reading can be ensured.

Further, when the rotational speed of a container may become higher than a predetermined value to generate a non-imaged portion in addition to the duplication of imaging, it is preferable to prepare a plurality of deformation model images made by contracting the character width of each model image, and include these deformation models as objects for pattern matching.

Further, the image in the area R2 to be read may be deformed in multiple ways, and each deformed image and the image prior to deformation may be respectively collated with the model image instead of the method for deforming the model image. Alternatively, both the model image and the image in the area R2 to be read are deformed in multiple ways, and each type of image including the model image prior to deformation and the image prior to deformation of the area R2 to be read may be sequentially combined to collate with one another.

In the above-described embodiment, although the deformation model image is not prepared for searching the head code in ST3, "YH" is commonly used as the head code, and thus, even if the head code in the image is subjected to deformation, the head code can be safely detected by detecting an area as the head code, for which a certain degree or more similarity can be found with respect to the model image of "YH". However, even for the head code, if a search using deformation model images in addition to a model image is carried out, the head code can be detected with further higher accuracy.

In the above-described embodiment, the bottle BT supported on the rotatable table 206 is axially rotated by a frictional force of the frictional roller 203, but not limited to this, the bottle BT may be axially rotated using a method of rotating the table 206.

In this case, if there is a possibility that rotation irregularity causes the rotational speed to be decreased less than a predetermined value, it is preferable to prepare deformation model images in multiple ways so that a part of the character width of each model image is enlarged, and perform pattern matching using the deformation model images. Whereas, if there is a possibility that rotation irregularity causes the rotational speed to be increased more than a predetermined value, it is preferable to prepare deformation model images in multiple ways so that a part of the character width of each model image is contracted, and perform pattern matching using the deformation model images.

Further, in the above-described embodiment, a line scan camera is used as the camera 201, but an area camera may be used instead of the line scan camera. Also in this case, a two-dimensional image, which displays the spread-out outer peripheral surface of the heel portion, is generated by performing a plurality of times of imaging during the rotation of the bottle BT and joining together the images generated by each time imaging, and thereafter the character recognition processing similar to the above-mentioned embodiment can be executed for the two-dimensional image. Additionally, when the area camera is used, the visual field of the camera is not necessarily illuminated.

In the above-described embodiment, the reading process of a mold number is carried out for a bottle with a character string code displayed on the heel portion, but the position where the character string code is arranged is not limited to the heel portion, and thus, for example, the character string code may be displayed at any appropriate position on the outer peripheral surface of a bottle.

DESCRIPTION OF THE REFERENCE NUMERALS

BT bottle
10 bottle making machine
101 Rough mold
102 Finishing mold
20A, 20B, 20C, 20D Inspection unit
200 Character reading device
201 Camera
203 Frictional roller
204, 205 Support roller
206 Table
207 Pulse motor
250 Controller
30 Information collection device
32 Analysis terminal device
34 Management server

The invention claimed is:

1. A character reader for reading and recognizing a character displayed at a predetermined height position on the outer peripheral surface of a plurality of cylindrical containers, the character reader comprising:
   a rotary drive mechanism for supporting the cylindrical container to rotate the cylindrical container around the central axis thereof;
   a camera positioned to face the cylindrical container so that a character displayed on the outer peripheral surface of the cylindrical container is captured within the visual field; and
   an image processing device for acquiring an image at the height position where the character is displayed over an angular range more than one rotation of the cylindrical container by controlling the imaging operation of the camera, thereby executing recognition processing,
   wherein the image processing device comprises:
      a search means for searching an image portion including all characters from the acquired image;
      a character recognition means for recognizing a character to be recognized by collating the image of the character to be recognized in the image portion searched by the search means with the model images of a plurality of types of characters; and
      an output means for outputting a recognition result recognized by the character recognition means for each cylindrical container,
   wherein the character recognition means is configured to execute any one of a first collation method whereby the image of a character to be recognized is collated with a standard model image for each of a plurality of types of characters and a plurality of model images created by increasing or decreasing the character-width of each standard model image; a second collation method whereby a plurality of images created by increasing or decreasing the character-width of the image of the character to be recognized is collated with the standard model image for each of the plurality of types of characters; and a third collation method whereby the plurality of images created by increasing or decreasing the character-width of the image of the character to be recognized is collated with the standard model image for each of the plurality of types of characters and the plurality of model images created by increasing or decreasing the character-width of each standard model image.

2. A character reader according to claim 1, wherein the camera is a line scan camera which is positioned such that the alignment direction of pixels is along the height direction of a cylindrical container.

3. A character reader according to claim 1, wherein the rotary drive mechanism comprises:
   a table for rotatably supporting the cylindrical container;
   a frictional roller brought into contact with the outer peripheral surface of the cylindrical container to rotate the cylindrical container around the central axis thereof with a frictional force; and
   a motor for driving the frictional roller.

4. A container inspection system comprising:
an inspection device for inspecting a cylindrical container formed by a plurality of molds with a character identifying each mold displayed at a predetermined height position on the outer peripheral surface to determine the quality for a plurality of inspection items;
a character reader for reading and recognizing the character on a plurality of cylindrical containers to be inspected by the inspection device; and
an information processing device for executing a process of totalizing inspection results inspected by the inspection device for each inspection item of each container for each mold corresponding to the character read by the character reader,
wherein the character reader comprises:
   a rotary drive mechanism for supporting the cylindrical container to rotate the cylindrical container around the central axis thereof;
   a camera positioned to face the cylindrical container so that a character displayed on the outer peripheral surface of the cylindrical container is captured within the visual field; and
   an image processing device for acquiring an image at the height position where the character is displayed over an angular range more than one rotation of the cylindrical container by controlling the imaging operation of the camera, thereby executing recognition processing,
wherein the image processing device comprises:
   a search means for searching an image portion including all characters from the acquired image;
   a character recognition means for recognizing a character to be recognized by collating an image of character to be recognized included in the image portion searched by the search means with the model images of a plurality of types of characters; and
   an output means for outputting a recognition result recognized by the character recognition means for each cylindrical container to the information processing device,
wherein the character recognition means is configured to execute any one of a first collation method whereby the image of a character to be recognized is collated with a standard model image for each of a plurality of types of characters and a plurality of model images created by increasing or decreasing the character-width of each standard model image; a second collation method whereby a plurality of images created by increasing or decreasing the character-width of the image of the character to be recognized is collated with the standard model image for each of the plurality of types of characters; and a third collation method whereby the plurality of images created by increasing or decreasing the character-width of the image of the character to be recognized is collated with the standard model image for each of the plurality of types of characters and the plurality of model images created by increasing or decreasing the character-width of each standard model image.

* * * * *